United States Patent [19]

Mayer

[11] 4,101,910
[45] Jul. 18, 1978

[54] AUTOMATIC DIAPHRAGM CONTROL SYSTEM MEANS FOR PREVENTING ENERGIZATION OF THE DIAPHRAGM ADJUSTING MECHANISM WHEN THE ADJUSTING MECHANISM IS AT THE LIMIT OF ITS ADJUSTING RANGE

[75] Inventor: Hermann Mayer, Esslingen, Fed. Rep. of Germany

[73] Assignee: Robert Bosch GmbH, Stuttgart, Fed. Rep. of Germany

[21] Appl. No.: 774,694

[22] Filed: Mar. 7, 1977

[30] Foreign Application Priority Data

Mar. 9, 1976 [DE] Fed. Rep. of Germany ....... 2609618

[51] Int. Cl.² ............................................. G03B 7/10
[52] U.S. Cl. ...................................... 354/42; 354/44; 354/271; 352/141; 318/469
[58] Field of Search ...................... 354/42, 43, 44, 271; 352/141; 318/611, 612, 615, 618, 626, 466, 468, 469, 470; 310/68 B, 183

[56] References Cited
U.S. PATENT DOCUMENTS

| | | | |
|---|---|---|---|
| 3,352,396 | 11/1967 | Moseley | 318/468 |
| 3,754,464 | 7/1956 | Wizenez et al. | 310/68 B |
| 3,772,974 | 11/1973 | Shimomura | 354/42 |
| 3,896,461 | 7/1975 | Higuma | 354/44 |

*Primary Examiner*—Donald A. Griffin
*Assistant Examiner*—William B. Perkey
*Attorney, Agent, or Firm*—Michael J. Striker

[57] ABSTRACT

A diaphragm-adjusting motor varies the setting of an adjustable diaphragm and includes a drive winding and a damping winding. A negative-feedback control circuit generates a scene-light-dependent error signal and energizes the drive winding of the adjusting motor in dependence upon the error signal. During adjusting motion of the adjusting motor, a damping voltage is induced in the damping winding. The damping voltage is utilized to modify the error signal in a sense opposing energization of the adjusting motor, so as to damp the adjusting motion of the adjusting motor and thereby prevent adjustment overshoots during normal operation. When the error signal reaches a preselected value, further energization of the drive winding of the adjusting motor is prevented. During normal operation, the lowering of the error signal effected by the damping voltage as the adjusting motor performs an automatic adjustment prevents the error signal from reaching the preselected value. However, when the adjusting motor reaches an extreme of its adjustment range and comes to a standstill, the damping voltage becomes zero. The error signal is no longer lowered by the damping voltage. If the error signal is still non-zero, the error signal will exceed the preselected value. This is detected, and further energization of the adjusting motor is prevented.

6 Claims, 1 Drawing Figure

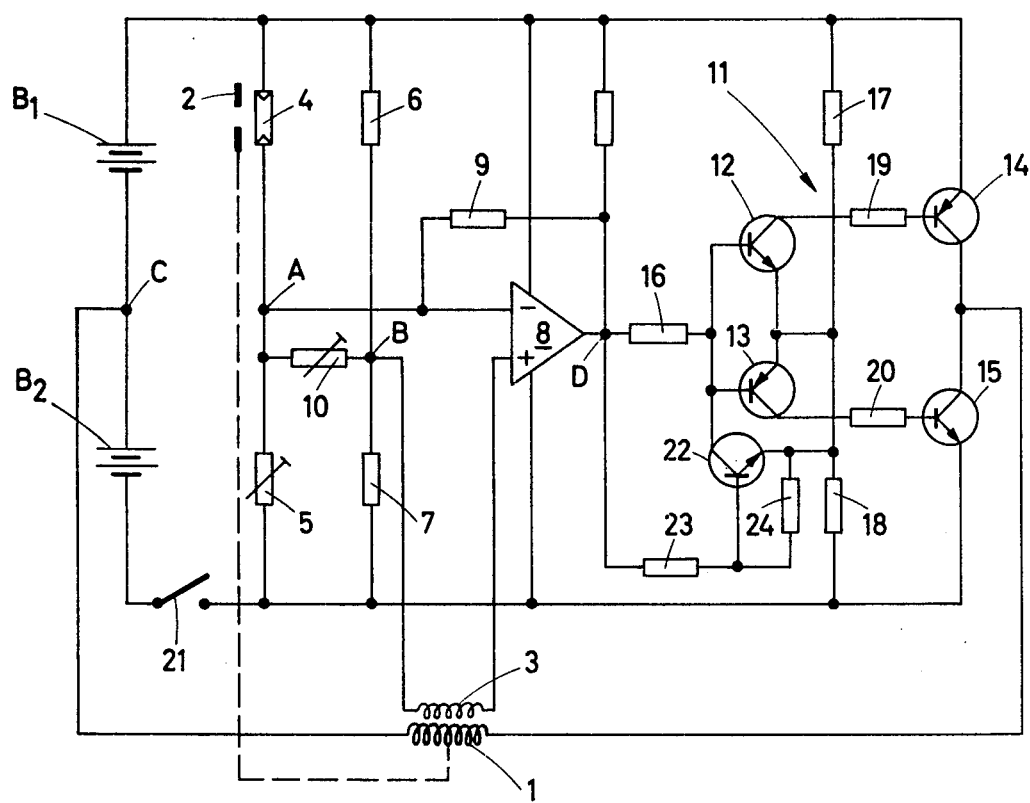

AUTOMATIC DIAPHRAGM CONTROL SYSTEM MEANS FOR PREVENTING ENERGIZATION OF THE DIAPHRAGM ADJUSTING MECHANISM WHEN THE ADJUSTING MECHANISM IS AT THE LIMIT OF ITS ADJUSTING RANGE

BACKGROUND OF THE INVENTION

The present invention relates to automatic diaphragm control arrangements. These arrangements sense scene light, and by negative-feedback action, automatically adjust the diaphragm aperture to the proper value.

Cameras incorporating automatic diaphragm control arrangements are usually provided with a main switch. The main switch is manually activatable by the user of the camera to disconnect the camera current source, usually a plurality of batteries, from the internal camera circuitry, and in particular the automatic diaphragm control circuit, when the camera is not going to be employed. However, if the user, before for example he places the camera in its storage case, neglects to open the main switch, the camera batteries will become discharged in a matter of hours, rendering the camera inoperative.

Various solutions have been proposed for this particular problem. It has been proposed to associate the main switch with the camera release button, or the like, so that the main switch will not close until the release button has been partially depressed. However, this proposed solution is disadvantageous, for example, in motion-picture camera, where often film transport will be initiated considerably before the automatic diaphragm control arrangement has set the diaphragm to the aperture size appropriate for the prevailing light. As a result, the initial portion of every scene will be improperly exposed.

SUMMARY OF THE INVENTION

It is the general object of the invention to avoid unnecessary current drain, particularly by the automatic diaphragm control system.

According to the preferred embodiment of the invention, this is achieved by detecting the change in one of the signals in the negative-feedback control circuit of the diaphragm control arrangement resulting when the negative-feedback control system reaches one of the limits of its negative-feedback adjustment range and the adjusting motor comes to a standstill. The detection of this signal change is utilized to generate a stop signal, which in turn is utilized to prevent further energization of the adjusting motor.

In this way, the energization of the adjusting motor of the automatic diaphragm control system is drastically reduced automatically, i.e., without participation by the user of the camera, as soon as the prevailing light conditions cause the control system to reach one of the limits of its adjustment range. To a very considerable degree, this avoids the danger that the camera batteries will become discharged when the user of the camera lays the camera away for a prolonged period of time without remembering to open the battery switch (main switch).

According to a particularly preferred embodiment of the invention, the negative-feedback control circuit of the automatic diaphragm control arrangement is provided with damping means. The damping means is operative, during motion of the adjusting motor, for furnishing a damping voltage which opposes the energization of the adjusting motor. This results, in the first place, in damping of the operation of the adjusting motor, reducing the tendency to overshoot the proper diaphragm setting during the course of an automatic diaphragm adjustment. In the second place, if the damping voltage is used to lower, for example, the aperture error signal of the negative-feedback system, this creates a unique way of detecting the fact that the limit of the adjusting capability of the control system has been reached. For example, it is possible to simply detect when the aperture error signal of the negative-feedback system reaches a preselected value. During normal operation, i.e., when the limit of the adjustment range of the adjusting motor has not yet been reached, the motion of the adjustment motor induces a damping voltage which is used to lower the value of the aperture error signal, so that even for large actual aperture-size errors the aperture error signal cannot reach the preselected value so long as the adjusting motor has not yet reached the limit of its adjustment range. However, when the motor reaches the limit of its range, it stops, and the damping voltage becomes zero. As a result, the error signal is no longer reduced by the damping signal, and can reach the preselected value, if the correct aperture size for the prevailing scene light has not yet been reached. Thus, simple detection of when the damped error signal reaches the preselected value constitutes a determination that further energization of the adjustment motor should be prevented.

In the preferred embodiment of the invention, the adjusting motor is provided with a drive winding and a damping winding. When the driving winding is energized and the adjusting motor is in motion, the damping voltage is induced in the damping winding.

The inventive expedient is of utility in general, for example even during operation of the camera. However, the inventive expedient is of particular significance, when one considers that when the user of the camera is finished filming, he typically inserts the camera into its carrying case and closes the case. In that event, the darkness of the case causes the automatic diaphragm control arrangement to attempt to open the diaphragm beyond the maximum limit of the adjustment range. The inventive expedient comes into play at this point, and prevents unnecessary energization of the automatic diaphragm control arrangement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE depicts an exemplary automatic exposure control system embodying principles of the invention.

DESCRIPTION OF THE PREFERRED EMBODIMENTS

In the exposure control system of the FIGURE, numeral 2 denotes an adjustable diaphragm. Numeral 1 denotes the drive winding of an adjusting motor. The adjusting motor may be of any construction. For example, it may be a rotary motor comprised of a rotor and a stator, with a permanent-magnet stator field and a rotor carrying the drive winding 1. Alternatively, the driving winding 1 could be on the stator, with the rotor being a permanent magnet structure. In principle, the adjusting motor could be non-rotary in operation.

The adjusting motor further includes a damping winding 3. Here, it is assumed that both the drive winding 1 and the damping winding 3 are located on the rotor or armature of the adjusting motor. When the drive winding 1 is energized, the armature of the adjusting motor rotates, by virtue of the interaction of the electromagnetic field produced by drive winding 1 and the permanent magnet field produced by the permanent magnet structure of the stator of the adjusting motor. As the motor rotor turns, the damping winding 3 thereon moves relative to the permanent magnet structure, and the permanent-magnet field induces in the damping winding 3 a damping (i.e., tachometric feedback) voltage. The utilization of the damping voltage is explained below.

Positioned behind the diaphragm 2 is a photoresistor 4. Photoresistor 4 and an adjustable resistor 5 together from a voltage divider connected across two camera batteries B1, B2. Tap A of this voltage divider is connected to the inverting input of a difference amplifier 8. A second voltage divider is constituted by fixed resistors 6 and 7. The tap B of this voltage divider is connected to the non-inverting input of difference amplifier 8, through the intermediary of the damping winding 3. Components 4–7 together constitute a light-dependent Wheatstone bridge, across whose diagonal the two inputs of difference amplifier 8 are connected.

Difference amplifier 8 is an operational amplifier provided with a feedback resistor 9, which determines the gain of the amplifier. The bridge circuit additionally includes a potentiometer 10, which can be adjusted to vary the contribution of the damping voltage induced in winding 3 to the output signal of the difference amplifier 8. Difference amplifier 8 controls the energization of drive winding 1, but is merely a preamplifier stage and does not actually carry the energizing current for winding 1.

Specifically, the output D of difference amplifier 8 is connected to the input of an output-power stage 11, which preferably has a non-linear transfer function. One end of drive winding 1 is connected to the output of power stage 11, whereas its other end is connected to the center tap C between the two batteries B1 and B2.

Power amplifier stage 11 includes two complementary input transistors 12, 13 and two complementary output transistors 14, 15. The bases of the input transistors are connected via a resistor 16 to output D of difference amplifier 8. The emitters of transistors 12, 13 are connected in common to the tap of a voltage divider constituted by fixed resistors 17 and 18. The collectors of transistors 12, 13 are connected, via respective current-limiting resistors 19 and 20, to the bases of the respective output transistors 14, 15.

The illustrated circuit furthermore includes a battery switch (main switch) 21 which can be opened by the user of the camera, to disconnect the battery from the camera circuitry.

The circuit also includes an electronic switch 22 operative when activated for preventing energization of drive winding 1. Switch 22 becomes activated when the diaphragm-adjusting motor reaches one of the limits of its adjustment range, but the correct aperture size for the prevailing scene light still has not been reached. This may occur, for example, if the user of the camera inserts it into its carrying case but forgets to open battery switch 21. Prevention of further energization of driving winding 1 prevents the camera batteries from becoming discharged.

In the illustrated embodiment, switch 22 is an npn transistor whose base is connected to the tap of a voltage divider constituted by resistors 23 and 24. Voltage divider 23, 24 is connected across the output of difference amplifier 8, thereby connecting switch 22 to the difference amplifier output. The collector of transistor 22 is connected to the base of input transistor 12 of power amplifier stage 11. Accordingly, the stop signal, which causes energization of drive winding 1 to be prevented, is derived from the output signal of preamplifier or difference amplifier stage 8 and is applied to the base of transistor 22 which, during normal operation, is non-conductive. Transistor 22 cooperates with the transistor pair 12, 14. The latter two transistors become conductive when the scene brightness level decreases and the aperture size requires an increase.

The operation of the illustrated circuit is as follows:

To turn on the automatic diaphragm control system, the user of the camera closes battery switch (main switch) 21, so that the negative-feedback control circuit of the diaphragm regulator receives current from batteries B1, B2.

Let it be assumed that the intensity of the light incident upon photoresistor 4 is of exactly such a magnitude that the measuring bridge comprised of resistors 4–7 is in balance; there is zero voltage difference between diagonal points A, B of the bridge. The two inputs of difference amplifier 8 and also its output are all at the middle value of the battery voltage; likewise, the voltage at the output of power stage 11 (the voltage at the collectors of transistors 14, 15) is at the same potential as the tap C of the two batteries B1, B2. Accordingly, there is no current flow through the drive winding 1 of the adjusting motor. The adjusting motor, and the diaphragm coupled thereto, remain in the setting they presently occupy, because no change of aperture size is required for the prevailing scene light.

If now the intensity of light incident upon photoresistor 4 changes, the resistance of photoresistor 4 changes, and the bridge circuit becomes unbalanced.

If the intensity of light incident upon photoresistor 4 increases to a value above the value required for proper film exposure, the ratio of resistors 4, 5 becomes smaller than that of resistors 6, 7. There appears at the output of the difference amplifier 8 a negative error voltage which renders transistors 13, 15 conductive. As a result, there is established in drive winding 1 a flow of current whose direction is such as to cause the drive winding 1 to effect a decrease of the diaphragm aperture size. Because the voltage at the output of the difference amplifier stage 8 is negative, transistor 22 remains non-conductive, even in the case where the smallest aperture size of the diaphragm is reached, the adjusting motor can adjust no further and comes to a standstill, and the error signal has still not been reduced to zero.

In contrast, let it be assumed that the light incident upon photoresistor 4 instead falls below the level required for proper film exposure. The ratio of resistors 4, 5 is now greater than the ratio of resistors 6, 7. There appears at the output D of difference amplifier 8 a positive error voltage, which renders conductive the transistors 12, 14 of the power stage 11. Current flow is established in the drive winding 1 in a direction causing the adjusting motor to increase the aperture size of the diaphragm 2. As a result, the light incident upon photoresistor 4 increases. The positive error voltage at the difference-amplifier output cannot reach the preselected value at which transistor 22 becomes conductive, so long as the adjusting motor has not yet reached the upper limit of its adjustment range. This is because, during the adjusting motion of the adjusting motor, the damping voltage induced in damping winding 3 effects a lowering of the positive error signal at the output D of difference amplifier 8.

In contrast, if the positive error voltage at output D causes the adjusting motor to reach the upper limit of its adjustment range and for that reason come to a standstill, for example in consequence of the reaching of a fixed stop defining the upper limit of the adjustment range of the motor, the damping voltage induced in damping winding 3 becomes zero. If now the error voltage is still positive, indicating that further opening of the diaphragm is required, although the upper limit of the adjustment range has already been reached, the error voltage, no longer lowered by the damping voltage, will reach a sufficiently high value to render transistor 22 conductive. As a result, transistors 12, 14 of power stage 11 become non-conductive, and further energization of the drive winding 1 is prevented. The only currents which continue to flow at this point are through the difference amplifier stage 8 and through the various voltage dividers. However, the sum of these currents is still much lower than the energizing current which would flow through drive winding 1, if transistor 22 were not utilized. Tests have indicated that, when a camera provided with a circuit such as disclosed is stored in its carrying case with its battery switch 21 left closed, it requires several days before the camera batteries become discharged to the point of inoperativeness. In contrast, if the circuit of the FIGURE were employed without the provision of the transistor 22, the batteries would become fully discharged within a few hours, if the battery switch 21 were left closed.

In the illustrated embodiment, energization of the drive winding 1 is prevented only when a non-zero error voltage persists even after the upper limit of the adjustment range has been reached. Additionally, it is possible to similarly prevent energization of the drive winding 1 when a non-zero negative error voltage persists even after the lower limit of the adjustment range has been reached. In the illustrated embodiment, this would require the use of a further transistor, of a conductivity type complementary to that of transistor 22. The base of such further transistor would be connected to the output of the difference amplifier stage 8, like transistor 22, whereas its collector would be connected to the base of input transistor 13 of power stage 11.

It will be understood that each of the elements described above, or two or more together, may also find a useful application in other types of circuits and constructions differing from the types described above.

While the invention has been illustrated and described as embodied in an automatic diaphragm control system of particular design, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an automatic exposure control system of the type comprised of an adjustable diaphragm, an adjusting motor coupled to the diaphragm for varying the diaphragm setting, the adjusting motor having a limited adjustment range, negative-feedback control means, including photosensitive means exposed to scene light, operative for generating an error signal dependent upon the difference between the actual diaphragm setting and the setting required for the prevailing scene light and operative for energizing the adjusting motor to an extent dependent upon the value of the error signal, in combination therewith, an arrangement for preventing further energization of the adjusting motor when the adjusting motor reaches a limit of its adjustment range and can effect no further change of diaphragm setting but the error signal indicates that a further change of diaphragm setting is required, the arrangement comprising interrupter means activated when the error signal reaches a preselected value and operative when activated for preventing energization of the adjusting motor; and damping means for damping the operation of the adjusting motor and preventing the error signal from reaching the preselected value so long as a limit of the adjustment range has not yet been reached by lowering the value of the error signal to an extent dependent upon the rate at which the adjusting motor changes the diaphragm setting.

2. The exposure control system defined in claim 1, the limit of the adjustment range of the adjusting motor corresponding to the largest-aperture setting of the diaphragm.

3. The exposure control system defined in claim 1, the adjusting motor including a drive winding, the damping means including a damping winding provided in the adjusting motor, the damping winding being so arranged within the adjusting motor and so connected to the negative-feedback control means that there is induced in the damping winding during adjusting motion of the adjusting motor a damping voltage which opposes the energization of the drive winding, the interrupter means comprising means operative for furnishing a stop signal in response to the error signal reaching the preselected value and means responsive to the stop signal for preventing further energization of the drive winding.

4. The exposure control system defined in claim 3, the negative-feedback control means including a preamplifier stage at whose output the error signal is generated and a power-output stage controlled by the error signal and energizing the drive winding of the adjusting motor, the means responsive to the stop signal comprising a normally non-conductive electronic switch connected to the input of the power-output stage and having a control input connected to receive the stop signal.

5. The exposure control system defined in claim 4, the power-output stage including an input transistor, the normally non-conductive electronic switch being a normally non-conductive transistor, the control input of the normally non-conductive electronic switch being its base and its collector being connected to the base of the input transistor of the power-output stage.

6. The exposure control system defined in claim 5, the negative-feedback control means including a voltage divider connected across the output of the preamplifier stage and having a voltage-divider tap connected to the base of the normally non-conductive transistor.

* * * * *